March 10, 1964 L. J. PENFOLD 3,124,158
LOCKING ARRANGEMENTS FOR THE CLOSURES OF PRESSURE VESSELS
Filed April 10, 1961 2 Sheets-Sheet 1
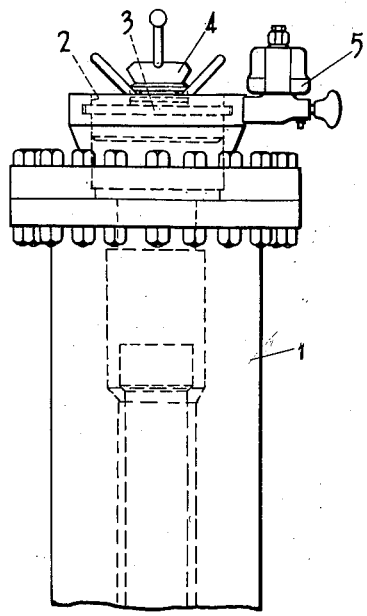
Fig. 1
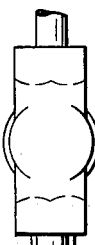
Fig. 4
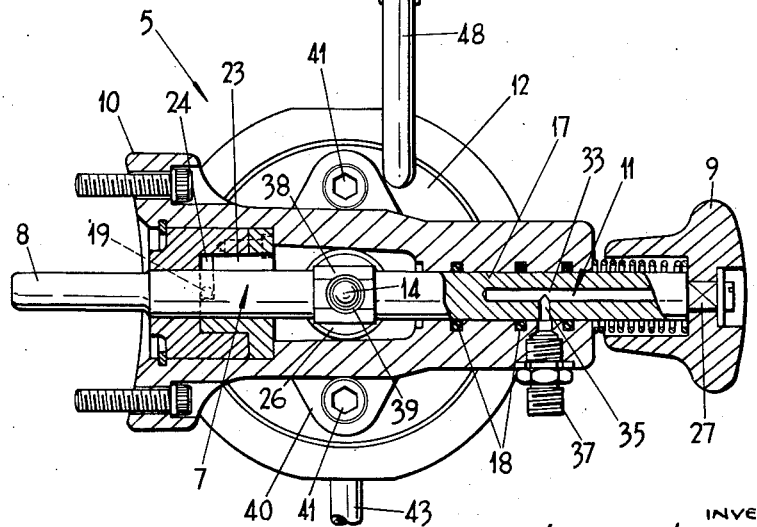
INVENTOR
LEONARD JAMES PENFOLD
BY
ATTORNEYS March 10, 1964  L. J. PENFOLD  3,124,158
LOCKING ARRANGEMENTS FOR THE CLOSURES OF PRESSURE VESSELS
Filed April 10, 1961  2 Sheets-Sheet 2

INVENTOR
LEONARD JAMES PENFOLD
BY
ATTORNEYS

United States Patent Office 3,124,158
Patented Mar. 10, 1964

3,124,158
LOCKING ARRANGEMENTS FOR THE CLOSURES OF PRESSURE VESSELS
Leonard James Penfold, Wembley, Middlesex, England, assignor to The General Electric Company Limited, London, England
Filed Apr. 10, 1961, Ser. No. 101,840
Claims priority, application Great Britain Apr. 13, 1960
2 Claims. (Cl. 137—584)

This invention relates to locking arrangements for the closures of pressure vessels.

It is desirable to incorporate in the design of a pressure vessel a locking arrangement for the closure of the vessel to prevent any removal or opening of the closure whilst gas at pressure is present in the vessel, since disastrous results can follow from any inadvertent removal or opening of the closure of a vessel which is charged.

Proposals have been made to provide some mechanical linkage between the locking mechanism of the closure of a pressure vessel and a pressure operated safety relief valve for the vessel so that any attempt at the removal of the closure results in the immediate lowering of the pressure within the vessel. However, it has been found that such a linkage, more especially after frequent use, develops lost motion with the result that the safety valve is not always operated sufficiently so that release of the closure is possible whilst there is still gas at pressure within the vessel.

It is an object of the present invention to provide an improved locking arrangement for the closure of a pressure vessel.

According to the present invention a locking arrangement for the closure of a pressure vessel, comprises a bolt arranged to secure the closure in a closed position and a locking pin sensitive to the pressure in the vessel and arranged to lock the bolt to prevent its release when the pressure in the vessel is above a predetermined value.

A locking arrangement in accordance wtih the invention may comprise a bolt arranged to secure the closure in a closed position, a locking pin operative to lock the bolt to prevent its release and means sensitive to the pressure in the vessel and arranged upon the raising of the pressure in the vessel above a predetermined value to effect the locking of the bolt.

The means may comprise a piston and cylinder device the cylinder being arranged to be fed with fluid from the pressure vessel and the locking pin to be operated by the piston.

The bolt may be associated wtih means for permitting the raising of the pressure in the vessel, the said means being operated when the bolt is in a securing position.

The bolt may incorporate a fluid valve arranged for connection in the fluid supply line to the vessel, the valve being operative to interrupt the fluid supply if the bolt is other than in a securing position.

Electrically operated means may be employed for raising the pressure in the vessel in which case the bolt would be arranged, in the securing position, to cause the closure of an isolating switch for the electrically operated means.

In order that the invention may be fully understood one locking arrangement, in accordance with the invention, for the closure of a pressure vessel constructed for sugar impregnation of carbon will now be described, by way of example, with reference to the accompanying drawings in which:

FIGURE 1 shows an elevation of part of the pressure vessel with the locking arrangement fitted thereto;

FIGURE 4 shows a sectional view taken on the line IV—IV in FIGURE 2.

Figure 2:
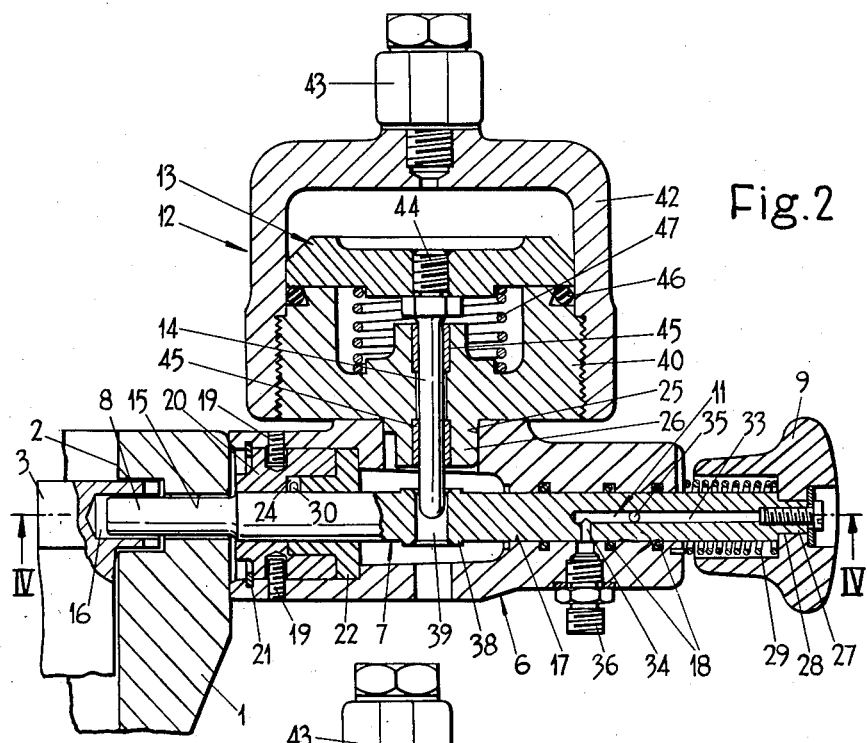
FIGURE 2 shows a sectional elevation of the locking arrangement in an operated condition.

Referring now to FIGURE 1 the vessel has a cylindrical body 1 in one end of which is formed an aperture 2 to receive a closure 3. The closure is provided with normal locking means 4 and additionally, a locking arrangement 5 in accordance with the invention.

Figure 3:
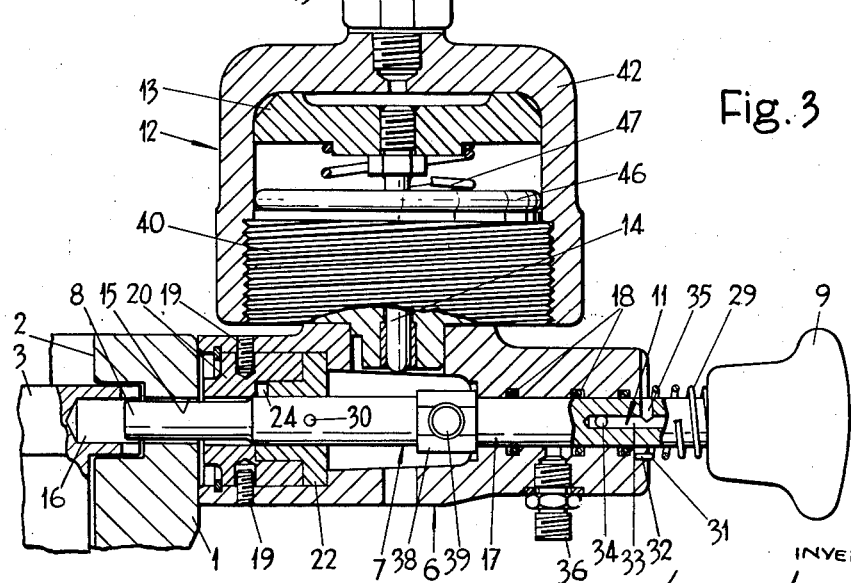
FIGURE 3 shows part of the same sectional elevation as in FIGURE 2 but in this view the locking arrangement is in an unoperated condition.

Referring now to FIGURES 2, 3 and 4 the locking arrangement 5 comprises a main body 6 of generally cylindrical shape which carries a bolt 7 with the axis of the bolt coinciding with the axis of the body 6, the bolt 7 having a slightly reduced part 8 at one end and carrying a knob 9 at the other. The bolt 7 incorporates a two-way valve 11 connected in the supply of gas for the pressure vessel and being operated to admit gas into the pressure vessel only when the bolt is shot forward, that is when the knob is moved fully towards the body as will be described in more detail later. The arrangement further comprises a pressure cylinder 12 mounted on the top of the body 6 with its axis at right angles to that of the body 6, which cylinder is arranged to be fed with gas from the pressure vessel and which houses a piston 13 carrying a locking pin 14 arranged to pass into the body 6 to lock the bolt 7 in the shot forward position. The body 6 is bolted, by means of a flange 10 thereof, to the side of the pressure vessel body 1 and a hole 15 is drilled through the wall of the vessel into the aperture 2, to allow the bolt 7 to pass into a recess 16 in the side of the closure 3 to secure the same in a closed position.

In more detail the body 6 is made of brass and is open at one end (that nearer the vessel body 1), the other end having a passage 17 through which the bolt 7 passes. Three O ring seals 18 are provided in the passage 17. A part of the inside of the flanged end of the body 6 is turned out a little to receive a cylindrical end plug 20 which is also made of brass and which is drilled to carry the bolt 7. The plug 20 is retained in place by socket screws 19 and a circlip 21. The inner end face of the end plug 20 (that is, the end face remote from the pressure vessel) is recessed to receive a shouldered bush 22 which fits into the recess in a mating relationship. The bush 22 has a longitudinal slot 23 and is shaped to leave, when fitted into the end plug 20, a further slot 24 circumferential to the bolt 7. The body 6 is drilled to form a side hole 25 passing into the inside of the body 6 and the purpose of this hole is to receive a boss 26 of the pressure cylinder 12 as will be described in more detail later.

Turning now to the bolt 7 the end of this remote from the closure 3 is shaped to form a squared part 27 on which is fitted the knob 9. The knob is of typical shape, having a rounded end and a tapered shank, and it has a square hole 28 to fit over the part 27. The inside of the knob 9 is drilled out a size larger than the bolt 7 to form a recess for a coil spring 29, which spring is compressed when the bolt 7 is moved to secure the closure 3. To locate the coil spring 29 the ends of the spring are turned out at 31 to enter recesses 32 as shown in FIGURE 3. The bolt 7 carries a cross pin 30 and as the bolt 7 is moved to secure the closure 3 the pin 30 slides in the slot 23. After the bolt 7 has reached the end of its travel the knob 9 is turned a quarter turn clockwise, so that the pin 30 enters the slot 24 to hold the bolt in position. Thus a bayonet type fixing is provided for the bolt 7. As stated above the bolt 7 incorporates a two way valve 11; this is provided by an axial passage 33, which for convenience of manufacture extends from the end of the bolt 7 carrying the knob 9, into which are lead two transverse passages 34 and 35 which passages align with gas couplings 36 and 37 respectively when the bolt 7 engages the closure 3. To the coupling 36 is attached the supply pipe from the gas supply and to the coupling 37 is attached the supply pipe from the gas supply and to the coupling 37 is attached the inlet pipe to the pressure vessel thus when the bolt 7 is in a securing position this supply is uninterrupted. However from FIGURE 3 it will be seen that when the bolt 7 is withdrawn the supply to the coupling 36 is interrupted, the passage 34 aligns with the coupling 37 and the passage 35 is open to atmosphere, it being remembered that the knob 9 has to be given a quarter turn to release the bolt 7, thus in the disengaged position of the bolt 7 the pressure vessel exhausts to atmosphere. At about half way along its length the bolt 7 has a thickened portion 38 in which there is drilled a transverse hole 39 to receive the locking pin 14 from the pressure cylinder 12.

Turning now to the cylinder 12, this comprises a steel base 40 having the boss 26 in its centre which base 40 is bolted to the body 6 by its bolts 41 with the boss 26 fitting into the side hole 25, and comprises a steel shell 42 which is screwed on to the base 40 to form the complete cylinder 12. The shell 42 has a connection 43 for a gas feed pipe from the pressure vessel. The piston 13 comprises a substantially flat head arranged to slide in the shell 42 in known manner, and into a hole 44 in the piston 13 is brazed the locking pin 19. The base 40 is fitted with polytetrafluoroethylene bushes 45 together with an O ring seal 46. A return spring 47 is provided for the piston 13 being operative to bias the piston 13 away from the base 40. The piston 13 is thus sensitive to the pressure in the pressure vessel, and serves to lock the bolt 7 in the securing piston.

In operation of the arrangement, when it is desired to start up the pressure vessel, the closure 3 is placed in position and locked by its normal locking means 4, and before the gas may be admitted and raised in the vessel the bolt 7 has to be moved into a securing position and the knob 9 given a quarter turn, whereupon gas flows through the valve 11 and is introduced into the pressure vessel. After the pressure in the vessel has reached a predetermined value the piston 13 is actuated and the locking pin 14 is moved so as to engage the transverse hole 39 is the bolt 7 thus locking it in place.

If now the pressure in the vessel is lowered, after the predetermined pressure has been reached the piston 13 will be urged by its return spring 47 so that the locking pin 14 is moved clear of the bolt 7 and the bolt may now be withdrawn.

With an arrangement as described, there is no likelihood of the pressure vessel being started up with the closure 3 not properly in place since under such conditions the bolt 7 could not be shot forward to close the valve 11, furthermore there is no possibility of the closure 3 being removed whilst gas at pressure is present in the vessel. In this connection the predetermined value can be chosen to be very small, for example, it can be ½ lb./sq. in. above ambient pressure this being the least pressure that will raise the closure.

The invention is, of course, equally applicable to vacuum vessels in which case the fluid connection 43 for the cylinder 12 would be on the stem side or the piston.

When the locking arrangement is fitted to steam pressure vessels, it may be found that particles of water condense on the walls of the cylinder 12 in which case a vacuum connection such as at 48 in FIGURE 4 may be used to extract from the cylinder 12 such particles.

As an alternative to the locking arrangement described above the valve 11 incorporated in the bolt 7 may be replaced by an electric switch. This form of locking arrangement is suitable for a pressure vessel in which electrically operated means are used to raise the pressure in the vessel and the locking arrangement would serve to close the switch only when the bolt is in a securing position.

The interior of the body 6 would be modified to form an additional compartment situated towards the knob and this compartment would house a switch contact base. The part of the bolt passing through this additional compartment would carry a bridging member for the contacts and as the bolt is moved into engagement with the closure so the contacts of the switch will be bridged.

I claim:

1. In a safety locking arrangement for the closure of a pressure vessel, the improvement comprising a main body secured to the pressure vessel, a bolt slidable within said main body to a securing position in which it secures the closure in a closed position, a locking pin mounted in said main body transversely to the bolt, the bolt including a locking aperture for receiving said locking pin and disposed to be aligned with the locking pin when the bolt is in a securing position, pressure sensitive means for actuating the locking pin in accordance with the fluid pressure within the vessel, and a slide valve comprising a first fluid coupling mounted on said main body for connection to a fluid pressure supply, a second fluid coupling mounted on said main body for connecting to the pressure vessel, and a duct within said bolt for providing a fluid connection between said first and second fluid couplings when the bolt is in the securing position.

2. In a safety locking arrangement for the closure of a pressure vessel, the improvement comprising a main body secured to the pressure vessel, a cylindrical bolt mounted within said main body and axially slidable to a securing position in which it secures the closure in a closed position, a bayonet fixing for said bolt, said bolt being rotatable about its axis when in its securing position to engage the bayonet fixing, a locking pin mounted in said main body transversely to the bolt, the bolt including a transverse locking aperture for receiving said locking pin and disposed to be aligned with the locking pin when the bolt is in a securing position and the bayonet fixing engaged, pressure sensitive means for actuating the locking pin in accordance with the fluid pressure within the vessel, and a slide valve comprising a first fluid coupling mounted on said main body for connection to a fluid pressure supply, a second fluid coupling mounted on said main body for connecting to the presure vessel, and a duct within said bolt for providing a fluid connection between said first and second fluid couplings when the bolt is in the securing position and the bayonet fixing engaged.

References Cited in the file of this patent

UNITED STATES PATENTS

| 2,718,239 | Erbguth | Sept. 20, 1955 |
| 2,797,948 | Tangard | July 2, 1957 |

FOREIGN PATENTS

| 1,075,908 | Germany | Feb. 18, 1960 |